(12) United States Patent
Jin et al.

(10) Patent No.: US 7,853,735 B2
(45) Date of Patent: Dec. 14, 2010

(54) EFFICIENT PROCESSING OF GROUPS OF HOST ACCESS REQUESTS THAT MAY INCLUDE ZERO LENGTH REQUESTS

(75) Inventors: Daming Jin, Costa Mesa, CA (US); Joe Chung-Ping Tien, Costa Mesa, CA (US); Michael P. Yan, Costa Mesa, CA (US); Vuong Cao Nguyen, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 45 days.

(21) Appl. No.: 11/956,262

(22) Filed: Dec. 13, 2007

(65) Prior Publication Data

US 2009/0157918 A1 Jun. 18, 2009

(51) Int. Cl.
*G06F 5/00* (2006.01)
(52) U.S. Cl. .............................. 710/39; 710/5; 710/22; 711/202
(58) Field of Classification Search .................. 710/22, 710/5
See application file for complete search history.

(56) References Cited

U.S. PATENT DOCUMENTS

| | | | | |
|---|---|---|---|---|
| 5,432,912 | A * | 7/1995 | Kihara | 710/30 |
| 6,457,072 | B1 * | 9/2002 | Fairman | 710/22 |
| 6,789,147 | B1 * | 9/2004 | Kessler et al. | 710/200 |
| 6,851,028 | B1 * | 2/2005 | Mak et al. | 711/154 |
| 7,543,131 | B2 * | 6/2009 | Hummel et al. | 711/202 |
| 2002/0103867 | A1 * | 8/2002 | Schilter | 709/206 |
| 2004/0083285 | A1 * | 4/2004 | Nicolson | 709/224 |
| 2005/0080943 | A1 * | 4/2005 | Pafumi et al. | 710/22 |
| 2005/0144310 | A1 * | 6/2005 | Biran et al. | 709/234 |
| 2006/0112199 | A1 * | 5/2006 | Sonksen et al. | 710/22 |
| 2006/0136682 | A1 * | 6/2006 | Haridas et al. | 711/154 |
| 2006/0212661 | A1 * | 9/2006 | Inagaki et al. | 711/147 |
| 2008/0140967 | A1 * | 6/2008 | Breslau et al. | 711/163 |

OTHER PUBLICATIONS

Patel, Naresh et al., "A Model of Completion Queue Mechanisms using the Virtual Interface API," Copyright 2000 by IEEE, pp. 280-288.*

(Continued)

*Primary Examiner*—Tariq Hafiz
*Assistant Examiner*—Dayton Lewis-Taylor
(74) *Attorney, Agent, or Firm*—Morrison & Foerster LLP (57) ABSTRACT

This is directed to methods and systems for handling access requests from a device to a host. The device may be a device that is part of the host, such as an HBA, an NIC, etc. The device may include a processor which runs firmware and which may generate various host access requests. The host access requests may be, for example, memory access requests, or DMA requests. The device may include a module for executing the host access requests, such as a data transfer block (DXB). The DXB may process incoming host access requests and return notifications of completion to the processor. For various reasons, the processor may from time to time issue null or zero length requests. Embodiments of the present invention ensure that the notifications of completion for all requests, including the zero length requests, are sent to the processor in the same order as the requests.

25 Claims, 8 Drawing Sheets

OTHER PUBLICATIONS

Wang, DS et al., "Notification Control Object for Asynchronous Request Queue," IBM TDB, Copyright 2005 by IP.com, pp. 1-2. http://priorartdatabase.com/IPCOM/000103341.*

Christenson, DA, "Priority Scheduling Algorithm," IBM TDB, Copyright 2005 by IP.com, pp. 1-3. http://priorartdatabase.com/IPCOM/000034988.*

* cited by examiner

Prior Art

EFFICIENT PROCESSING OF GROUPS OF HOST ACCESS REQUESTS THAT MAY INCLUDE ZERO LENGTH REQUESTS

FIELD OF THE INVENTION

This invention generally relates to network devices and more specifically to processing of DMA requests in network devices.

BACKGROUND OF THE INVENTION

Network devices may be devices that are provided as part of a computer or another computing device (a host) and are used to offload some network processing from a CPU of the host. Thus, network devices can include, for example, host bus adapters (HBAs) that connect to Fibre Channel, SCSI, Ethernet or other types of networks or network interface adapters (NICs) that connect to Ethernet and other types of networks.

Network devices are usually designed to perform a predefined narrow range of operations (usually limited to processing network communications) fast and efficiently. Thus, network devices may include software and hardware that is very finely tuned for a relatively narrow range of precisely defined tasks.

Direct memory access (DMA) is a memory access scheme that allows various peripheral devices (such as a network device) to read and write to memory with minimal CPU involvement. Network devices and HBAs often use direct memory access to write received and processed incoming network communications to the host memory and to read communications that are to be sent over the network from the host memory.

Existing network devices can include software (or firmware) which performs various DMA operations. The firmware may accomplish this by issuing instructions to a hardware designed to perform DMA operations. In some cases, the firmware may issue instructions for null or zero length DMA operations. Null DMA operations are operations that do not require that any data be written or read from the host's memory. While strictly speaking, null DMA operations are not necessary, they may be issued by the firmware nevertheless, for optimization reasons. For example, it may be faster for the firmware to issue a null DMA operation than to check whether a DMA operation it is about to issue is a null operation and not to issue it if it is.

The firmware usually processes completion notifications for all DMA operations issued by it to determine whether they were successfully completed. Completion notifications for null DMA operations are usually received by the firmware much faster than those for any other operation, because null DMA operations do not require any memory access to be completed. This causes completion notifications to be received by the firmware out of order, which in turn requires the firmware to take additional steps to identify the completion notifications.

SUMMARY OF THE INVENTION

This is directed to methods and systems for handling access requests from a device to a host. The host may be a computer or another computing device. The device may be a device that is part of the host, such as an HBA, an NIC, etc. The device may include a processor which runs firmware and which may generate various host access requests. The host access requests may be, for example, memory access requests, or DMA requests. The device may include a module for executing the host access requests, such as a data transfer block (DXB). The DXB may process incoming host access requests and return notifications of completion to the processor.

For various reasons, the processor may from time to time issue null or zero length requests. These are requests that do not actually require that any host access be performed. Embodiments of the present invention ensure that the notifications of completion for all requests, including the zero length requests, are sent to the processor in the same order as the requests. Thus, the processor may be able to process the notifications of completion faster.

DETAILED DESCRIPTION OF EXEMPLARY EMBODIMENTS

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Although embodiments of the present invention are described herein in terms of HBA adapters for storage area networks, it should be understood that the present invention is not limited to such circuits, but is generally applicable to any network devices that utilize direct memory access.

Figure 1:
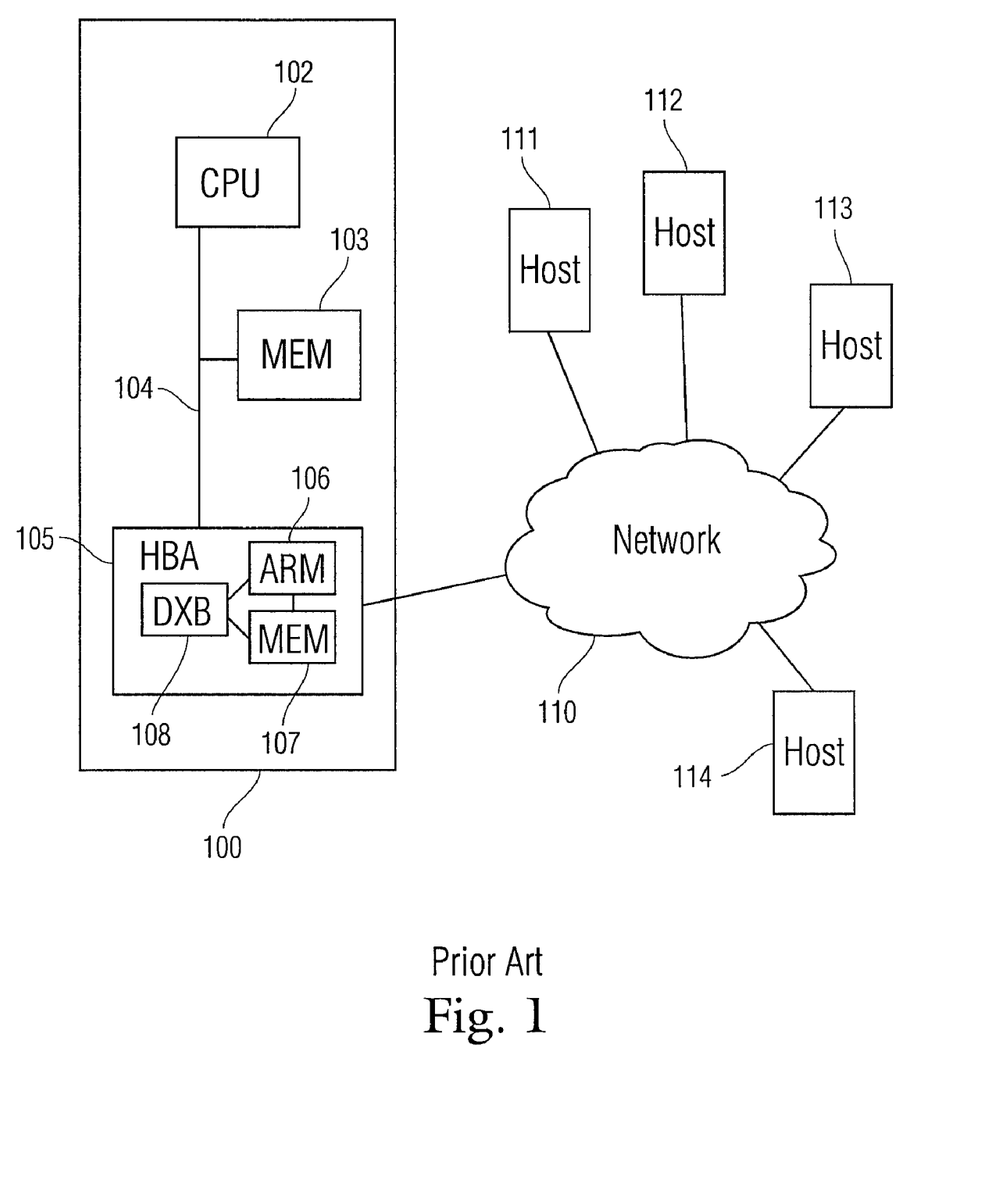
FIG. 1 is a diagram of an exemplary HBA equipped host computer connected to a network.

FIG. 1 is a diagram of an exemplary host computer connected to network. The host can include a CPU 102 and a memory 103 connected through a bus 104. The CPU may execute various software stored at the memory.

Some of the software executed by the CPU 102 may require network communications and perform them by communicating with a network device 105 attached to the bus 104. In the present example, the network device is an HBA, but it may be a NIC or another type of network device. The network device can include a processor, (such as an embedded ARM processor 106), a memory 107 as well as a data transfer block (DXB) 108. The processor of the network device can execute embedded software (referred to as firmware) read from the network device memory 107. While an ARM processor is provided as an example, the network device may feature a processor of another type.

The network device may process communications received from software executing at CPU 102 (host software) and send them over the network. Furthermore, the network device may process communications received from the network and send them to the host software. The network device may communicate with host software by directly reading or storing communications to/from host memory 103. This may be achieved by a technique known as Direct Memory Access (DMA). In some embodiment the network device can also (or instead) communicate with host hardware that does not actually run any host software (or any software at all). The DXB may include hardware which is used to process DMA communications to and from the host memory.

The host computer 100 need not be a computer but may be any other similar device (such as a router, "smart" household device, portable computing device, etc.)

The HBA may be connected to a network 110. The network may be connected to various other hosts 111-114. The network may be any type of network, including but not limited to an Ethernet network, a Fibre Channel network, a SCSI network, a heterogeneous network, the Internet, etc.

As noted above, DMA is often used by network devices to save incoming network communications or read outgoing network communications. Since, sending and receiving network communications is the major function of a network device, network devices often perform a large number of DMA operations. Consequently, DMA access is also relatively large factor in the overall performance of a network device. Therefore, many HBAs and other network devices include highly optimized DMA access components.

Figure 2:
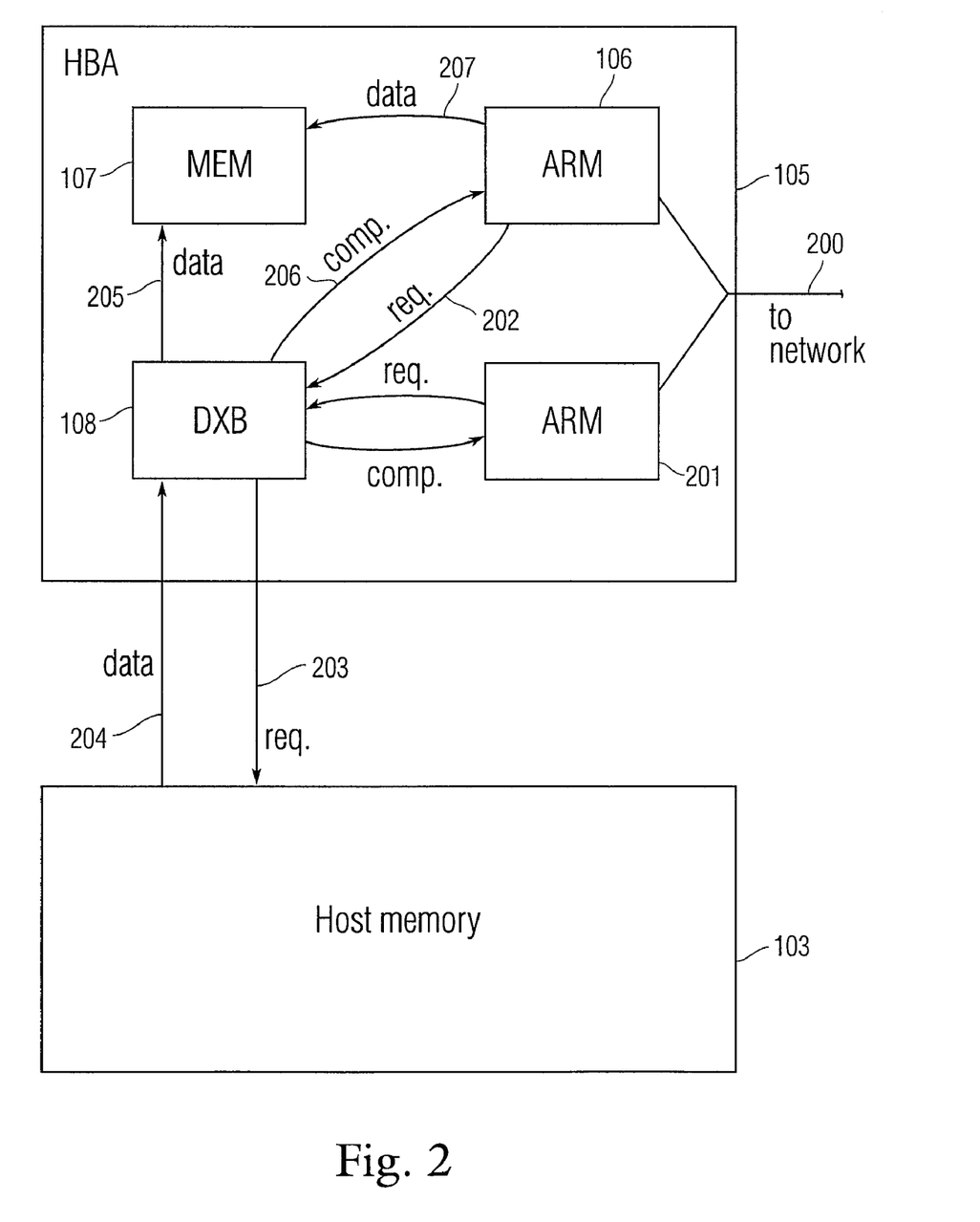
FIG. 2 is a diagram showing communications between an HBA and a host memory during direct memory access.

The DXB may provide some of these optimizations by offloading some of the processing related to DMA requests from the HBA's ARM processor. The DXB may include application specific circuitry and/or a programmable controller with associated firmware. FIG. 2 shows some aspects of the operation of the DXB in more detail.

FIG. 2 shows the HBA 105 having two ARM processors (106 and 201) as is often the case for presently available HBAs. The ARM processors may communicate with a network link 200 (they may do so through other HBA modules). When either of the ARM processors needs to perform a DMA operation it can send a request to the DXB 108. More specifically, if ARM processor 106 needs to read some data that the host is trying to send over a network from the host's memory 103, the ARM processor may send request 202 to the DXB 108 for that data.

The DXB may process the request and send a DMA request 203 based on request 202 to the host memory. The host memory 103 can respond by sending a data transfer 204 back to the DXB. The DXB can save the data in local HBA memory 107 (data transfer 205) while at the same time monitoring the amount of data received in order to determine whether the request has been completed. Once the DXB determines that the request has been completed, it can send a completion notification back to ARM processor 106. Having received the completion notification, the ARM processor can retrieve the data from the local HBA memory 107 as necessary (data transfer 207).

The other ARM processor 201 can perform DMA access in a similar manner. Furthermore, either ARM processor can use a similar procedure to perform DMA writes to host memory (as opposed to reads as shown in FIG. 2). In the case of writes, an ARM processor may store data in the local HBA memory 107, and send a request to DXB 108. The DXB may take the data from the local HBA memory and store it in host memory 103 utilizing the host's DMA write procedures. Having stored all data in the host memory the DXB can then send a completion notification to the requesting ARM processor.

Requests and data sent and received to and from the host (see, e.g., 203, 204) as well as any completion notifications received from the host (not shown) can be considered external, as they are communications that are external to the HBA. On the other hand, requests and completion notifications that are sent between the DXB and the ARM processor (see, e.g., 202 and 206) can be considered to be internal as they are sent and received within the HBA.

In some HBAs, two DXBs can be used to serve each ARM processor. In such case each DXB may only process requests associated with its respective ARM processor.

Usually, DMA requests issued by the ARM processors are requests to read or write a specific amount of data. The amount of data to be written or read may be indicated by the ARM processor (e.g., by specifying a number of bytes in the request). However, in some HBAs, zero length requests may be utilized. A zero length request is a request to read or write data of size zero. Thus, the zero-length request may be viewed as a "no-op", or a "null operation"—i.e. an operation that will not result in any data being written or read from the host's memory at all. While at first glance useless, zero length requests may be very useful at optimizing the programming and operation of the ARM processor(s). For example, allowing the ARM processor to issue zero length requests may allow for the removal of several operations at the processor which may have been needed to check whether a request that is about to be issued is zero length or not and not issue the request if it is zero length.

Thus, some DXBs are provided with functionality for handling zero length requests. Since a zero length request may be viewed as a no-op, many existing DXBs handle such requests by issuing a completion notification for a zero length request upon receiving the request without performing any DMA operations. Thus, for many existing DXBs the completion notification can be issued before similar notifications are issued for non zero-length requests (for which DMA operations are performed).

Figure 3A:
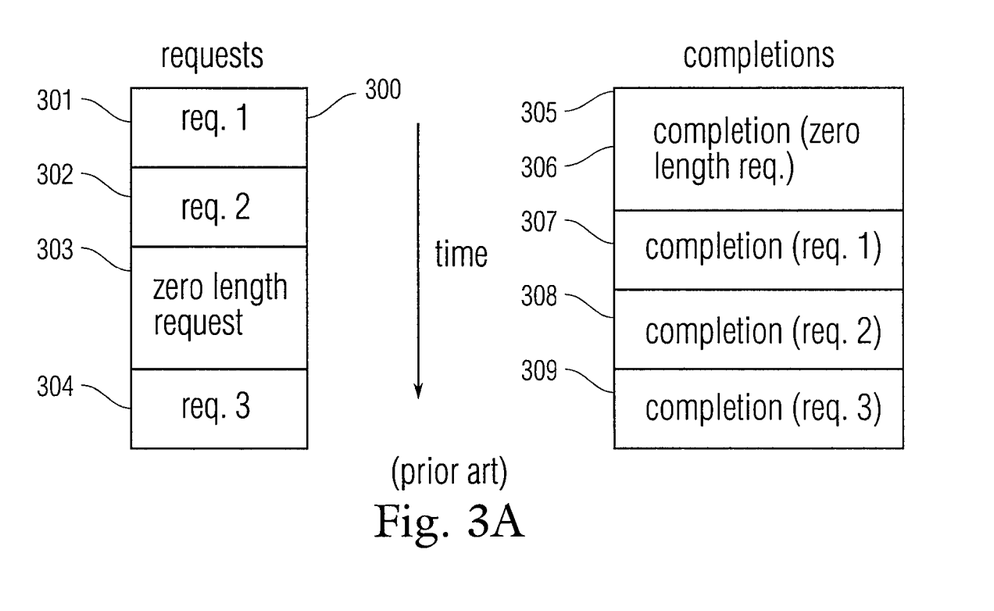
FIG. 3A is a diagram showing exemplary ordering of requests and completion notifications in existing devices.

FIG. 3A illustrates the above in more detail. Table 300 shows an exemplary sequence of requests as issued by the ARM processor pursuant to executing software (or firmware). The requests are ordered according to relative time of issuance, with the topmost request being issued first. As it can be seen zero length request 303 is issued third after non zero length requests 301 and 302.

Table 305 shows a sequence of completion notifications sent by the DXB to the ARM processor to notify it of completions of the various requests of table 300. It can be seen that the completion of the zero length request (completion 306) is issued first, while the completions associated with the non-zero length requests (completions 307-309, associated with requests 301, 302 and 304 as shown) are issued after it. Thus, the zero length completion is issued out of order.

The ARM and firmware running thereon may be able to process out of order completions as shown in table 305. However, this may be inefficient, as it may require that the firmware examine each completion in order to map it to a particular request. On the other hand, if it were guaranteed that completions are to be issued in order, then the firmware could process the completions much faster by matching completions with requests on a FIFO basis without needing to examine and match various identification numbers of the completions with those of the requests.

Figure 3B:
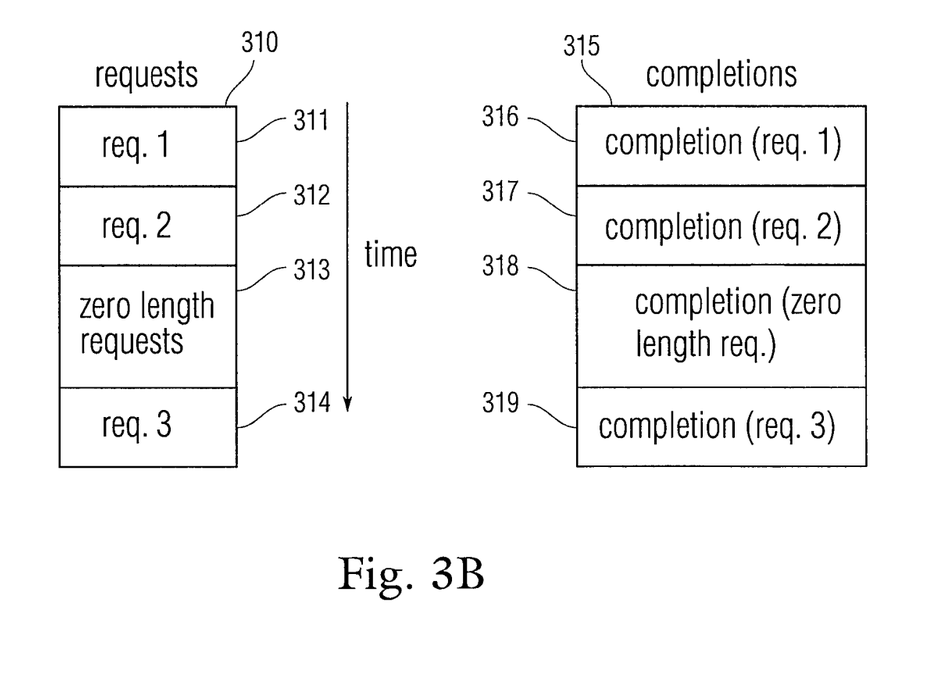
FIG. 3B is a diagram showing exemplary ordering of requests and completion notifications according to embodiments of the present invention.

Accordingly, FIG. 3b shows a scheme for processing DMA requests according to embodiments of the present invention. Table 310 shows a sequence of requests 311, 312, 313 and 314 that are ordered according to time of issuance by the ARM processor. Request 313 is a zero length request, as shown. Table 315 shows a sequence of completion notifications ordered according to time of issuance by the DXB. Completion notifications 316-319 are associated with requests 311-314 respectfully.

It can be seen that the completion notification associated with the zero length request (completion 318) is issued in the same relative order as the zero length request 313 (i.e., it is issued third). Thus, the relative order of completion notifications is preserved and matches that of the originally issued request. Consequently, processing the completion notifications and associating them with their respective requests can be performed much quicker and more efficiently by the ARM processor and its firmware than would have been the case for the prior art scheme of FIG. 3A.

Figure 4:
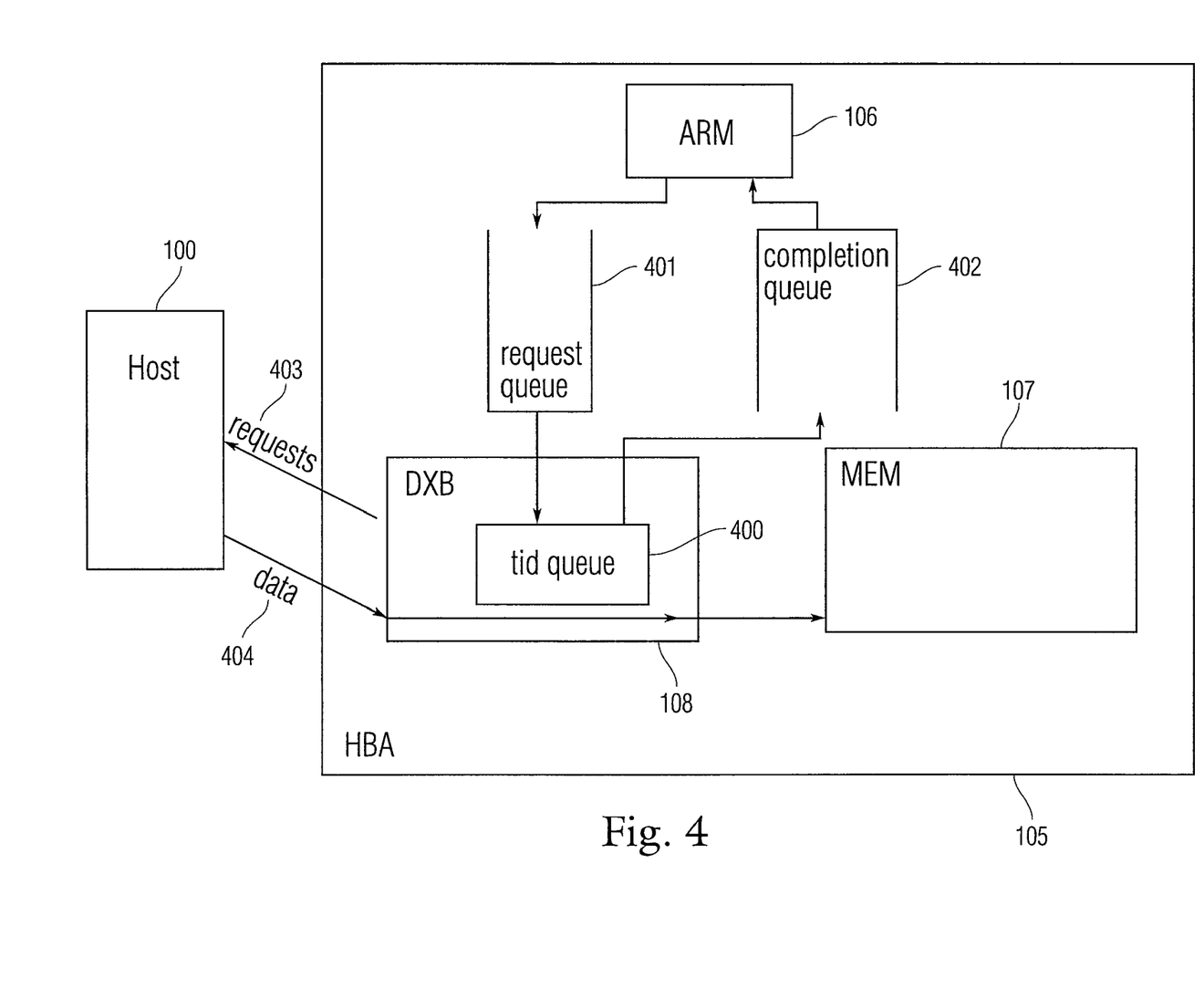
FIG. 4 is diagram showing exemplary processing of DMA requests according to embodiments of the present invention.

FIG. 4 is a diagram showing processing of DMA requests according to embodiments of the present invention. Software executing at the ARM processor sends various requests to a request queue 401. The request queue is shown as a separate element for clarity but may be part of the HBA local memory 107.

The DXB obtains requests from the request queue and saves them in a TID (tag ID) queue. A tag ID is an identification that is associated with a request and a completion notification for that request. The TID queue is a queue that holds the tag IDs (as well as other data) for pending DMA requests—i.e., requests that have been issued by the ARM and received by the DXB but are have not yet been completed by issuing a completion notification.

In addition to saving a request in the TID queue the DXB issues a corresponding DMA request 403 to the host. The host sends data 404 in response to the request. When the DXB receives the data it matches it with a pending request saved in the TID queue and saves it in the HBA local memory 107. The DXB may also modify the entry of the TID queue associated with the matched request to indicate where data associated with that request is being saved and how much data associated with the request was received and saved, thus indicating whether the request is complete or not.

If the DXB receives a zero length request it may save it in the TID queue. The DXB need not send a request to the host based on the zero length request, or receive any data for the zero length request from the host. The zero length request may be considered to be completed as soon as it is placed in the TID queue. The DXB may be configured to ignore (i.e., not claim or otherwise respond to) any host completions received from the host having the same TID as the zero length request. Since the zero length request was not sent to the host, these completions may be associated with completely unrelated requests from other devices connected to the same bus as the HBA.

The DXB may include local memory for storing the TID queue. Alternatively the TID queue may be stored in the memory of the HBA 107. The DXB may also include an internal memory (or internal FIFO) for storing data received from the host before forwarding it to the local memory 107.

Figure 5:
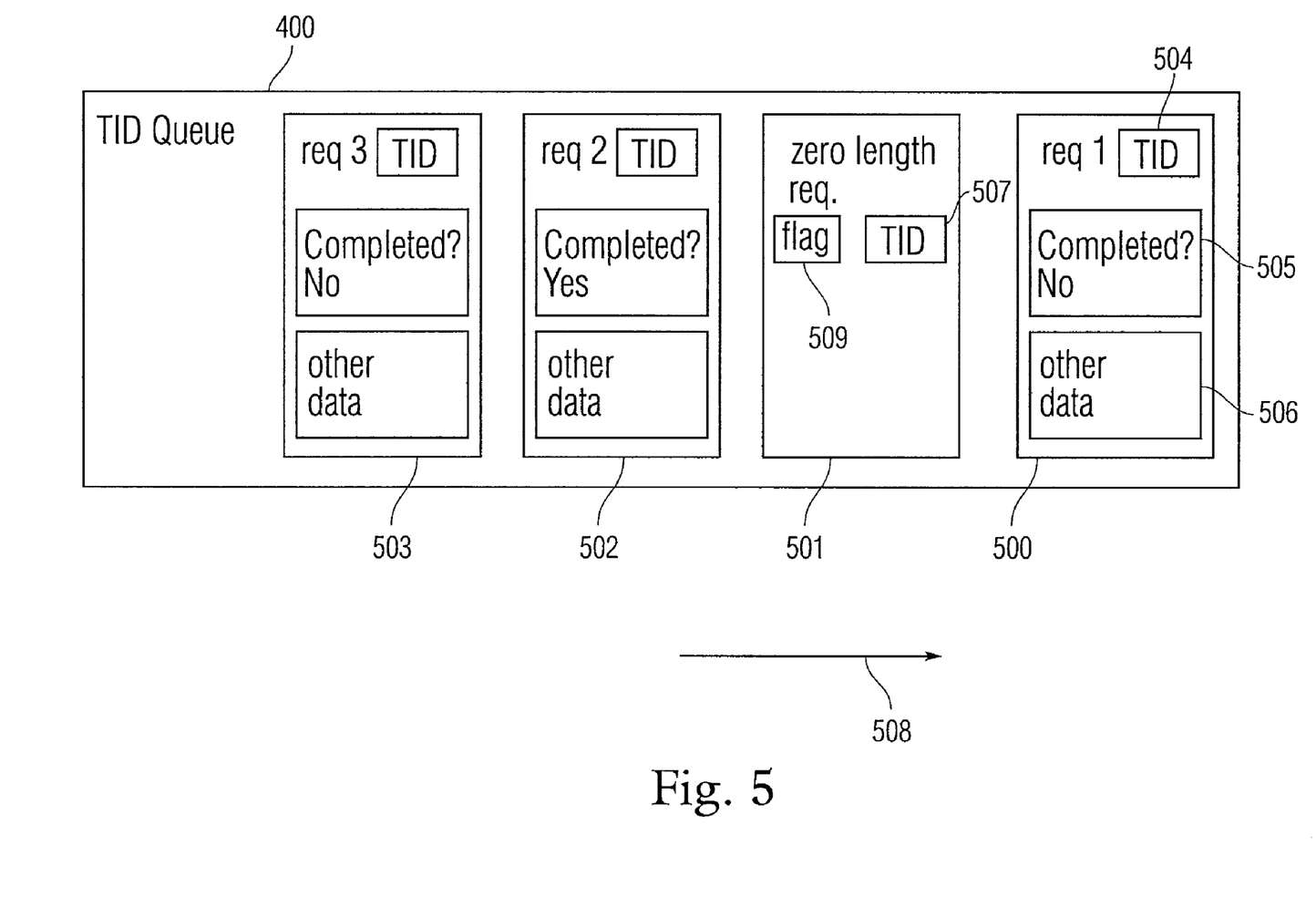
FIG. 5 is a diagram showing an exemplary TID queue according to embodiments of the present invention.

FIG. 5 is a diagram showing an exemplary TID queue. TID queue 400 may store requests 500-503, as shown. Record 500 may be a record for non-zero length request (req. 1). It may include a TID field, 504 which indicates the TID assigned to the request. It may also include a completed field 505 which indicates whether the request has been completed. In the context of FIG. 5, a request may be considered completed when all data associated with it is received from the host. In this case, the request of record 500 has not been completed. The record may also include other data field 506 for storing other data (such as the memory locations in local memory 107 where data received from the host and associated with the request is stored).

Record 501 may be a record for a zero length request. The fact that this record is associated with a zero length request may be indicated in the record, for example, by setting a flag 509. The zero length request record may also include a TID field (field 507). As noted above, zero length requests are considered completed as soon as they are stored in the TID queue. Therefore, the zero length request record need not include a field indicating whether it is completed (alternatively, some embodiments may include the field nevertheless, indicating that the request is completed). The zero length request record may or may not include an other data field. It need not store locations of saved data (as zero length requests are not expected to have any saved data associated with them).

Request records 502 and 503 are similar to record 500. In the present example, the request associated with record 502 is completed, while that associated with record 503 is not.

The records of the TID queue are stored in the order in which their associated requests were received from the ARM processor (the earlier received records being placed in the direction of arrow 508). Thus, req. 1 of record 500 was received first, while req. 3 of record 503 was received last. However, as noted in the present example, the request need not be completed in the order they were received. Thus, req. 2 of record 502 is completed, while the first request (req. 1 of record 500) is not. The order of completion depends on when data for the various requests is received from the host. The host need not send data in order based on the timing of the DMA requests it receives. Therefore, it is possible to have requests complete out of order, as shown in FIG. 5.

The DXB removes the first request record in the queue if it has been completed. The DXB usually does not remove records other than the first regardless of whether they are completed or not. Thus, since record 500 is not completed, no record is removed from the queue. When the DXB removes a record it composes a completion notification based on the record and sends it to the completion queue 402 (see FIG. 4). After this step, the request for which a completion notification was sent may be considered to be finally complete.

When the first record is removed from the queue, the following record takes its place and is itself removed and processed if it is indicated as being complete. Thus, if record 500 becomes complete, it will be removed from the queue and a notification of completion will be stored in the completion queue. Next, zero length request record 501 will be checked for completion. Since it is a record for a zero length request, it is complete by definition. Therefore, it is also removed from the queue and processed to form a completion notification which is stored in the completion queue. Next record 502 of req. 2 is processed. Since it is also complete, it is also removed and a completion notification issued. Thus, completion notifications can be issued for various requests in order in which the requests were received, regardless of the fact that the host need not complete DMA requests in the order in which it receives them. Furthermore, completion notifications for zero length requests can also be issued in the order in which these requests were received. Thus, completions for zero length requests need not leapfrog other requests due to the fact that zero length requests are essentially completed instantaneously.

Placing the completion notification in the above described order in the completion queue 402, allows the ARM processor to process the completion notifications in the order in which their respective requests were issued, thus greatly simplifying the firmware running at the processor as well as improving the speed of processing of the requests.

Figure 6:
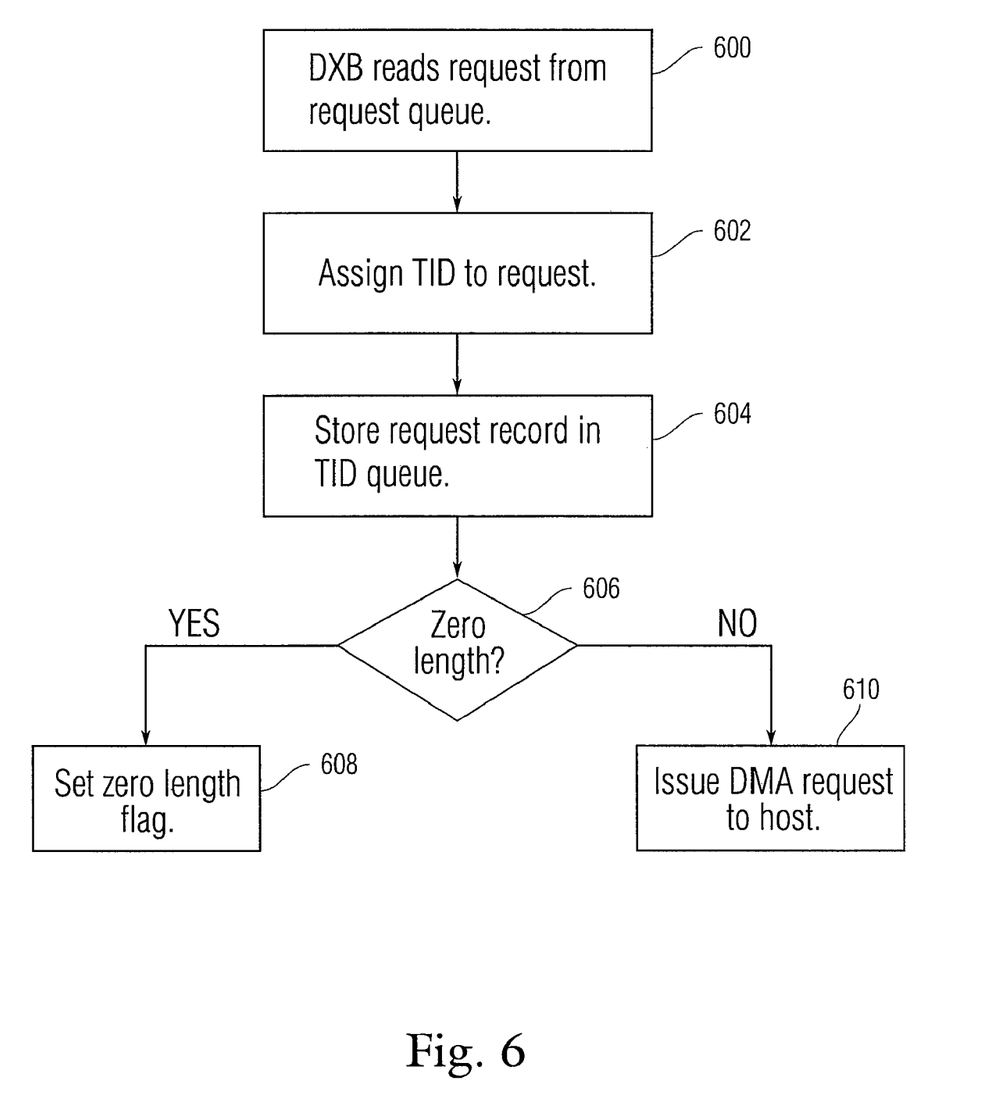
FIG. 6 is a flow chart showing an exemplary method of initial processing of incoming requests by the DXB according to embodiments of the invention.

FIG. 6 is a flow chart showing an exemplary method of initial processing of requests. At step 600, the DXB reads a request from the request queue. At step 602, the DXB assigns a TID to the request. At step 604, the DXB stores a record associated with the request in the TID queue. At step 606, the DXB determines whether the request is zero length. If it is a zero length request, the DXB sets a zero length flag (step 608). If it is not a zero length request, the DXB issues a DMA request to the host based on the received request (step 610). Afterwards, the process returns to step 600 and the DXB reads the next request from the request queue (if present).

Figure 7:
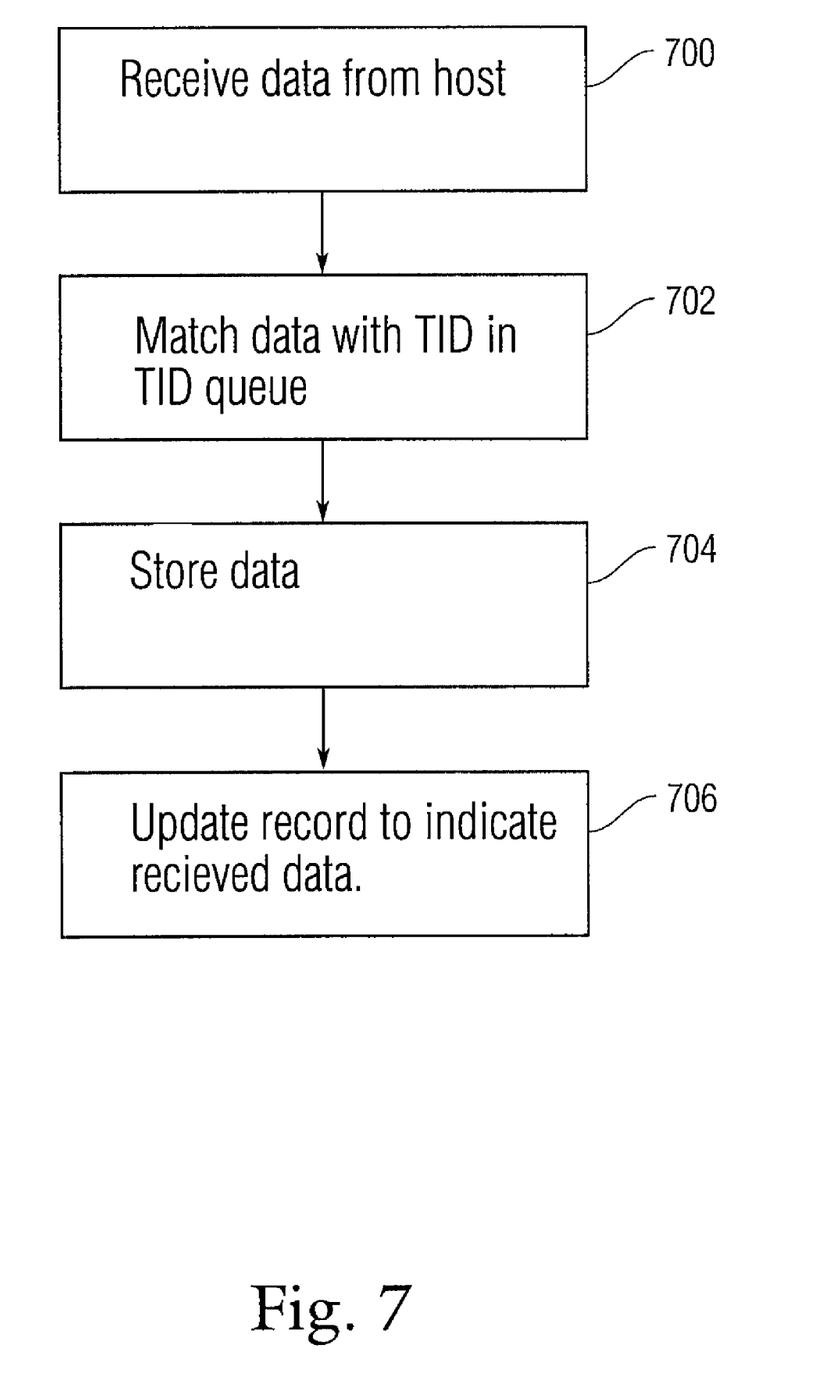
FIG. 7 is a flow chart showing an exemplary method of processing incoming data received from the host by the DXB according to embodiments of the invention.

FIG. 7 is a flow chart showing exemplary processing of incoming data by the DXB according to some embodiments. The incoming data of FIG. 7 is data issued by the host in response to a DMA request previously issued by the DXB (see FIG. 6, step 610). At step 700, the DXB receives data from the host. At step 702, the DXB matches the received data with a request record stored in the TID queue. This may be accomplished by matching a TID provided by the host with the data with a respective TID stored in one of the records in the TID queue. At step 704, the DXB can store the data in the local HBA memory 107, or alternatively in an internal DXB cache. In step 706, the DXB updates the record for the request for which data was received to indicate the received data. The update may indicate how much data was received, whether the request is complete and/or where the data is stored.

Figure 8:
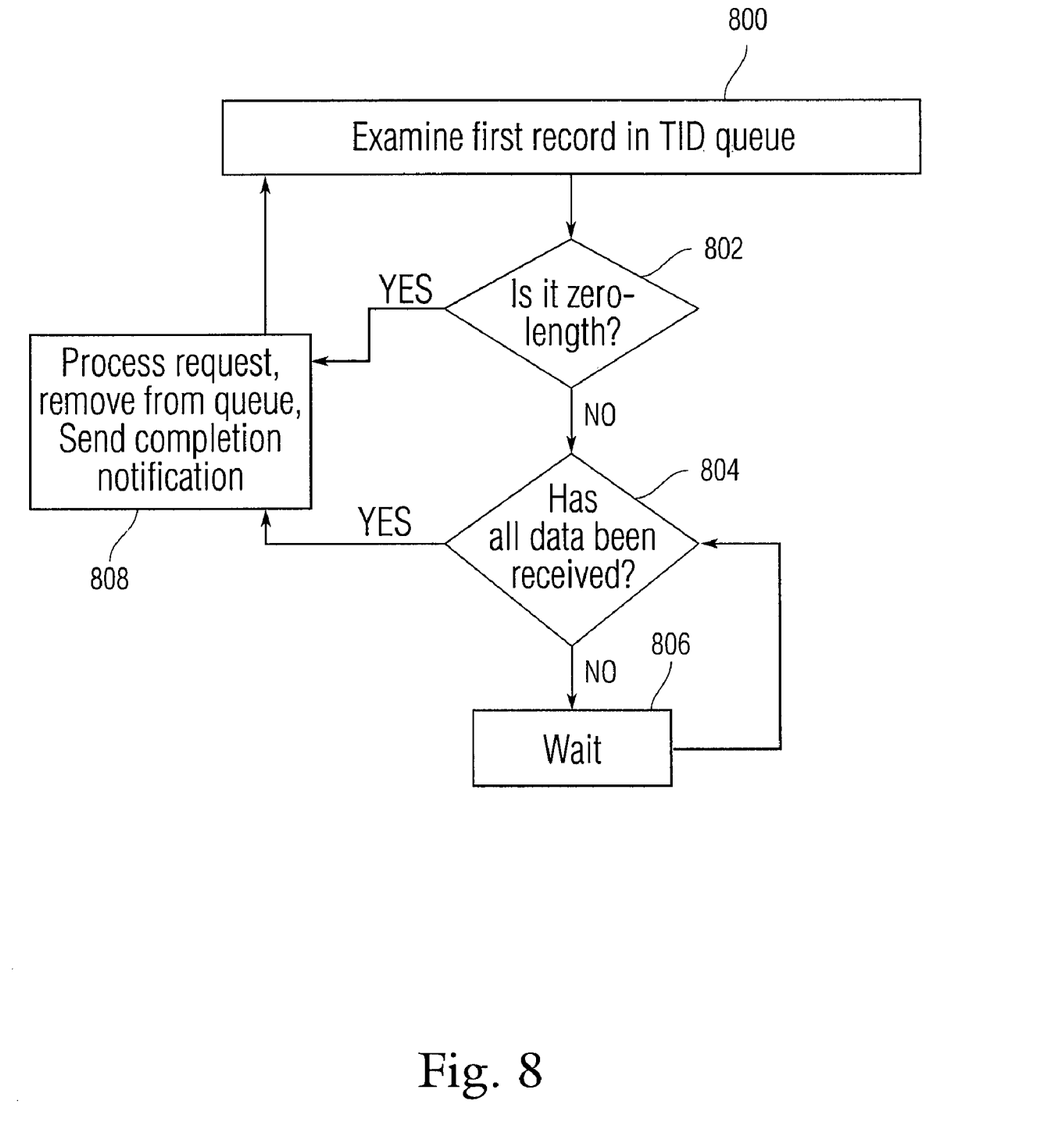
FIG. 8 is a flow chart showing an exemplary method of processing request records in the TID queue by the DXB according to embodiments of the invention.

FIG. 8 is a flow chart showing the processing of records in the TID queue by the DXB according to some embodiments. At step 800, the DXB examines the first request record in the TID queue (the first request being the request that was received in the queue first). At step 802, the DXB determines whether the record is associated with a zero length request. If that is the case, the DXB processes the record by removing the record from the queue and forming and sending a completion notification based on the request record (step 808). The completion notification may be sent to the completion queue 402.

If the record is not associated with a zero length request, the DXB determines whether the all data for the request has been received (i.e., whether the request is complete). This may be performed, for example, by examining an appropriate field in the request record. If the request is not complete, the DXB waits until all data has been received for that request. If all data has been received, the DXB processes the non-zero length request in step 808. As part of the processing, the request record is removed from the queue and a completion notification is sent out.

As discussed above zero length requests may be issued as a by product of some optimizations of the device processor firmware. However, in some embodiments, zero length requests may be issued for other reasons. For example, a zero length request may be issued by the firmware in order to serve as a marker of sorts. More specifically, the firmware may issue a zero length request after issuing a group of requests. It can then examine the completion queue for a notice of completion for the zero length request. Once the notice of completion is issued, the firmware can use that as an indication that all requests of the group of requests have also been completed (as the group of requests was issued before the zero length request).

While the above discussion centers on the case where the HBA obtains data from the host using DMA, a person of skill in the art would recognize that it can be easily applied to the case where the HBA instead saves data to the host. The operation of the DXB in the latter case may be very similar to that described above. However, instead of sending DMA requests to the host, the DXB would send requests for DMA storage along with data to the host (the data being obtained from the local HBA memory 107). Furthermore, the DXB would not receive any data from the host, but would instead receive notifications of completion of DMA write operations. Based on these notifications, the DXB can determine whether and to what extent the various requests whose records have been stored in the TID queue have been completed.

Embodiments of the present invention may include DXBs that can process both requests to store and receive data according to the methods discussed above. Some embodiments may feature separate TID queues for requests to store and receive data. Other may use a single queue for both requests to store and receive data. Similarly a single set or separate sets of the request and completion queues can be used.

While the discussion above centers on DMA requests, the present invention is not thus limited. It may apply to other types of communications with a host. Furthermore, embodiments of the present invention may apply to communications with another device within the host, such as an external memory module, a hard disk drive, etc.

Similarly, while the discussion above centers on HBAs, embodiments of the present invention are not limited to HBAs. Thus, embodiments may include other devices, such as NICs, hard drives, Flash drives, optical storage drives, modems, wireless adaptors, etc.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A system comprising a host comprising a device and a host memory, the device comprising:
   a device processor configured to execute device firmware to issue a plurality of internal host memory access requests, the plurality of internal host memory access requests including at least one zero length request issued subsequent to at least one non-zero length request; and
   a data transfer block connected to the device processor and including electronic circuitry configured to
      process the at least one non-zero length internal host memory access request by sending one or more external host memory access requests to the host,
      process the at least one zero length internal host memory access request internally without sending any requests to the host, and
      delaying sending to the device processor a notification of completion associated with the at least one zero length internal host memory access request until after a notification of completion associated with the at least one non-zero length request is sent to the device processor.

2. The system of claim 1, wherein the electronic circuitry of the data transfer block is application specific circuitry.

3. The system of claim 1, wherein the electronic circuitry of the data transfer block includes a generally programmable controller and a memory storing firmware for the controller.

4. The system of claim 1, wherein the device is a host bus adapter (HBA).

5. The system of claim 1, wherein the device is a network interface card (NIC).

6. The system of claim 1, wherein the device further includes a local memory including the device firmware.

7. The system of claim 1, wherein the data transfer block further includes an internal request queue, and is further configured to:
   store a plurality of records in the internal request queue, each record being associated with one of the internal host memory access requests, the records being stored in the queue in the order in which their associated requests were issued by the device processor; and
   order the timing of issuance of completion notifications for the various internal host memory access requests based on the placement of the records associated with said requests in the internal request queue.

8. The system of claim 1, wherein the data transfer block is further configured to receive one or more responses from the host in response to the external host memory access requests.

9. The system of claim 8 wherein determining when each of the various internal host memory access requests have been processed by the host is performed by examining the responses received from the host.

10. A local area network comprising the system of claim 1.

11. A storage area network comprising the system of claim 1.

12. A device configured for connection to a host comprising a host memory, the device comprising:
   a device processor configured to execute device firmware to issue a plurality of internal host memory access requests, the plurality of internal host memory access requests including at least one zero length request and at least one non-zero length request; and
   a data transfer block connected to the device processor and including electronic circuitry configured to
      process the at least one non-zero length internal host memory access request by sending one or more external host memory access requests to the host,
      process the at least one zero length internal host memory access request internally without sending any requests to the host, and
      delay sending to the device processor a notification of completion associated with the at least one zero length internal host memory access request until after a notification of completion associated with the at least one non-zero length request is sent to the device processor.

13. The device of claim 12, wherein the electronic circuitry of the data transfer block is application specific circuitry.

14. The device of claim 12, wherein the electronic circuitry of the data transfer block includes a generally programmable controller and a memory storing firmware for the controller.

15. The device of claim 12, wherein the device is a host bus adapter (HBA).

16. The device of claim 12, wherein the device is a network interface card (NIC).

17. The device of claim 12, wherein the device further includes a local memory including the device firmware.

18. The device of claim 12, wherein the data transfer block further includes an internal request queue, and is further configured to:
   store a plurality of records in the internal request queue, each record being associated with one of the internal host memory access requests, the records being stored in the queue in the order in which their associated requests were issued by the device processor; and
   order the timing of issuance of completion notifications for the various internal host memory access requests based on the placement of the records associated with said requests in the internal request queue.

19. The device of claim 12, wherein the data transfer block is further configured to receive one or more responses from the host in response to the external host memory access requests.

20. The device of claim 19 wherein determining when each of the various internal host memory access requests have been processed by the host is performed by examining the responses received from the host.

21. A method for processing memory access communications at a device connected to a host comprising:
   issuing a plurality of internal host memory access requests by a device processor, the plurality of internal host memory access requests including at least one zero length request and at least one non-zero length request; and
   processing the at least one non-zero length internal host memory access request by a data transfer block by sending one or more external host memory access requests to the host;
   processing the at least one zero length internal host memory access request by the data transfer block internally without sending any requests to the host; and
   delaying sending to the device processor a notification of completion associated with the at least one zero length internal host memory access request until after a notification of completion associated with the at least one non-zero length request is sent to the device processor.

22. The method of claim 21, wherein the device is a host bus adapter (HBA).

23. The method of claim 21, further comprising:
   storing a plurality of records in the internal request queue by the data transfer block, each record being associated with one of the internal host memory access requests, the records being stored in the queue in the order in which their associated requests were issued by the device processor; and
   ordering the timing of issuance of completion notifications for the various internal host memory access requests by the data transfer block based on the placement of the records associated with said requests in the internal request queue.

24. The method of claim 21, further comprising receiving one or more responses from the host by the data transfer block in response to the external host memory access requests.

25. The method of claim 24 wherein determining when each of the various internal host memory access requests have been processed by the host includes examining the responses received from the host.

* * * * *